(12) United States Patent
Gibbs et al.

(10) Patent No.: US 6,898,191 B1
(45) Date of Patent: May 24, 2005

(54) DIGITAL RADIO

(75) Inventors: Jonathan Alastair Gibbs, Southampton (GB); Richard Lucas, Hampshire (GB)

(73) Assignee: Motorola, Inc., Schaumburg, IL (US)

( * ) Notice: Subject to any disclaimer, the term of this patent is extended or adjusted under 35 U.S.C. 154(b) by 1034 days.

(21) Appl. No.: 09/611,937

(22) Filed: Jul. 7, 2000

(30) Foreign Application Priority Data

Jun. 29, 1999 (GB) ............................................. 9915168

(51) Int. Cl.[7] .................................................. H04J 3/00

(52) U.S. Cl. ........................ 370/280; 370/276; 370/277; 370/278; 370/294

(58) Field of Search ................................. 370/276, 277, 370/278, 279, 280, 294, 336, 337, 345, 347, 437, 442, 465, 535–537, 493–495; 455/522, 450–452; 375/219, 377

(56) References Cited

U.S. PATENT DOCUMENTS

| | | | | |
|---|---|---|---|---|
| 5,379,279 A | * | 1/1995 | Backof et al. ............... | 370/280 |
| 5,504,773 A | * | 4/1996 | Padovani et al. ............ | 375/130 |
| 5,602,836 A | * | 2/1997 | Papadopoulos et al. ..... | 370/280 |
| 5,802,046 A | * | 9/1998 | Scott ........................... | 370/280 |
| 6,088,337 A | * | 7/2000 | Eastmond et al. .......... | 370/280 |
| 6,175,738 B1 | * | 1/2001 | Flake et al. .................. | 455/451 |
| 6,393,007 B1 | * | 5/2002 | Haartsen ..................... | 370/337 |
| 6,477,176 B1 | * | 11/2002 | Hamalainen et al. ....... | 370/435 |
| 6,496,706 B1 | * | 12/2002 | Jou et al. ..................... | 455/522 |
| 6,724,735 B1 | * | 4/2004 | Gibbs et al. ................. | 370/280 |

FOREIGN PATENT DOCUMENTS

EP    0 654 916 A2    5/1995

* cited by examiner

*Primary Examiner*—Wellington Chin
*Assistant Examiner*—Chuong Ho
(74) *Attorney, Agent, or Firm*—Steven R. Santema; Valeria M. Davis

(57) ABSTRACT

The invention concerns a digital radio (2) for pseudo-duplex radio communication, and a method of transmission time mediation for pseudo-duplex radio communication.

A digital radio (2) is in time division duplex communication with a second digital radio (4). The digital radio (2) derives a source signal activity parameter (VAD) indicating the likelihood of there being a source signal for transmission by the digital radio (2) to the second digital radio (4) over a single radio channel. The digital radio (2) also derives a first value ($VADDir_1$) of a signal direction parameter (VADDir) in dependence on both the value of the signal activity parameter (VAD) for the digital radio (2) and a second value ($VADDir_2$) of the signal direction parameter (VADDir) received from the second digital radio (4);

The digital radio (2) selects the proportions of time for transmission and reception over the single radio channel in dependence on the first value ($VADDir_1$) of the signal direction parameter (VADDir). The digital radio (2) also transmits the first value ($VADDir_1$) of the signal direction parameter (VADDir) to the second digital radio (4), to allow the second digital radio (4) to perform an analogous update of its value of the signal direction parameter (VADDir).

The apparatus and method of the invention are robust to radio channel and VAD value imperfections.

12 Claims, 2 Drawing Sheets

DIGITAL RADIO

BACKGROUND

Digital portable and mobile radios may be arranged either to communicate with one another via base stations, or directly with one another in 'direct mode'. The communication will typically either be over a digital simplex communication channel, or over a digital semi-duplex communication channel.

FIG. 1 illustrates the general scheme of a personal mobile radio (PMR) system 10. Portable radios 2, 4 and 6 of FIG. 1 can communicate with a base station 8. Radios 2, 4 and 6 could equally well be mobile radios mounted in vehicles. Each of the radios shown in FIG. 1 can communicate through base station 8 with one or more other radios. If radios 2, 4 and 6 are capable of direct mode operation, then they may communicate directly with one another or with other radios, without the communication link passing through base station 8.

Portable and mobile radios may employ a regular payload framing structure. This structure consists of a structure of fixed time points at which parts of the communication begin and end.

Conventionally, in a back-to-back radio system employing a single frequency in a time division duplex fashion to convey duplex voice, each radio utilised the available radio resource for 50% of the time.

However, utilization of the radio resource for 50% of the time does not take advantage of the time discontinuity of human speech, whereby for the majority of the time, only one of the two parties in the call is speaking at any one time. In addition, when a party is speaking, their ability to judge the quality of the audio being conveyed to them is impaired. This is the principle which allows operation of the so-called pseudo-duplex method, where under normal circumstances the majority of the capacity is devoted to the active speaker and then in periods of double-talk (both speakers active) the system reverts to a conventional Time Division Duplex (TDD) scheme. The present application describes an implementation of the controlling protocol for such a pseudo-duplex scheme.

The closest known technologies relate to Voice Activity Detection (VAD) schemes applied to cellular applications of rate control and discontinuous operation and hands-free speaker-phone control techniques. Voice Activity Detection involves measuring the amount of voice signal currently requiring transmission. When the user of a radio is speaking, the VAD measurement is different from when the user is not speaking, and only background noise is detected.

The VAD in cellular systems is biased in order to ensure that when a party speaks, the radio, including the speech codec and RF circuitry etc., will be active to convey that speech to the other party in the presence of background noise and other impairments. However, this leads to transmission of data when a party is not speaking. The cost of this is slightly lower battery life and slightly increased interference to co-channel users in other cells of the system. These are essentially second (or higher) order effects. In these systems, there is no concept of a finite resource being available to the duplex call. It is entirely possible and consistent for the uplink and downlink, which are almost always on different carriers, to be simultaneously utilising the full bandwidth.

In a speaker phone system, in order to overcome the need for acoustic echo control, the phone may be in 'microphone mode' or 'speaker mode', but never both at the same time. The control algorithm has access to audio signals from the incoming telephone line and the microphone on which to base the decision over which mode to apply at any one time. There is no sense that the speakerphone must convey its decision to another unit since it alone has full control over the decision.

For a pseudo-duplex control scheme, two units must mutually agree on the best channel usage, based upon the activity of the two parties. They must convey their relative VAD measurements to one-another to allow a decision algorithm to be executed jointly. Furthermore, all of this must be done in a controlled manner in the presence of transmission errors which could cause unexpected behaviour.

A need exists to alleviate the problems of the prior art.

DETAILED DESCRIPTION OF THE PREFERRED EMBODIMENT

A digital radio for pseudo-duplex radio communication in accordance with the invention, comprises: signal transmission means for time division duplex signal transmission over a single radio channel; signal reception means for time division duplex signal reception over the said single radio channel; a controller adapted to derive a value of a source signal activity parameter VAD for the digital radio, the source signal activity parameter VAD indicating the likelihood of there being a source signal for transmission by the digital radio to a second digital radio over the said single radio channel; the controller being further adapted to derive a first value of a signal direction parameter VADDir, the first value of the signal direction parameter VADDir being derived in dependence on both the value of the signal activity parameter VAD for the digital radio and a second value of the signal direction parameter VADDir received from the second digital radio; the controller being further adapted to receive the second value of the signal direction parameter VADDir over the said single radio channel from the second digital radio, and to transmit the first value of the signal direction parameter VADDir over the said single radio channel to the second digital radio; the controller being further adapted to select the proportions of time for transmission and reception in dependence on the first value of the signal direction parameter VADDir.

The inventive method of transmission time mediation for pseudo-duplex radio communication comprises:
(i) transmitting a first time division duplex signal over a single radio channel;
(ii) receiving a second time division duplex signal over the said single radio channel;
(iii) deriving a value (VADDir$_1$) of a source signal activity parameter VAD, the source signal activity parameter VAD indicating the likelihood of there being a source signal for transmission as the first time division duplex signal over the said single radio channel;

(iv) receiving a value (VADDir$_2$) of a signal direction parameter VADDir with the second time division duplex signal over the said single radio channel;

(v) deriving a revised value (VADDir$_1$) of the signal direction parameter VADDir, the revised value (VADDir$_1$) of the signal direction parameter VADDir being derived in dependence on both the value of the signal activity parameter VAD and the value (VADDir$_2$) of the signal direction parameter VADDir received with the second time division duplex signal over the said single radio channel; and (vi) transmitting the revised value (VADDir$_1$) of the signal direction parameter VADDir over the said single radio channel and selecting the proportions of time for transmitting the first time division duplex signal and receiving the second time division duplex signal in dependence on the revised value (VADDir$_1$) of the signal direction parameter VADDir.

The claimed invention shows particular robustness to VAD and channel imperfections.

Figure 1:
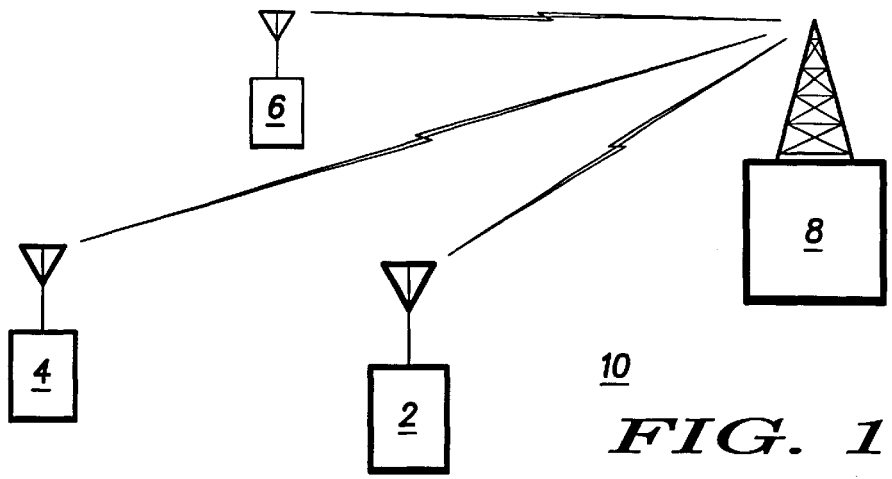
FIG. 1 illustrates an arrangement of portable and/or mobile radios and a base station.
Figure 2:
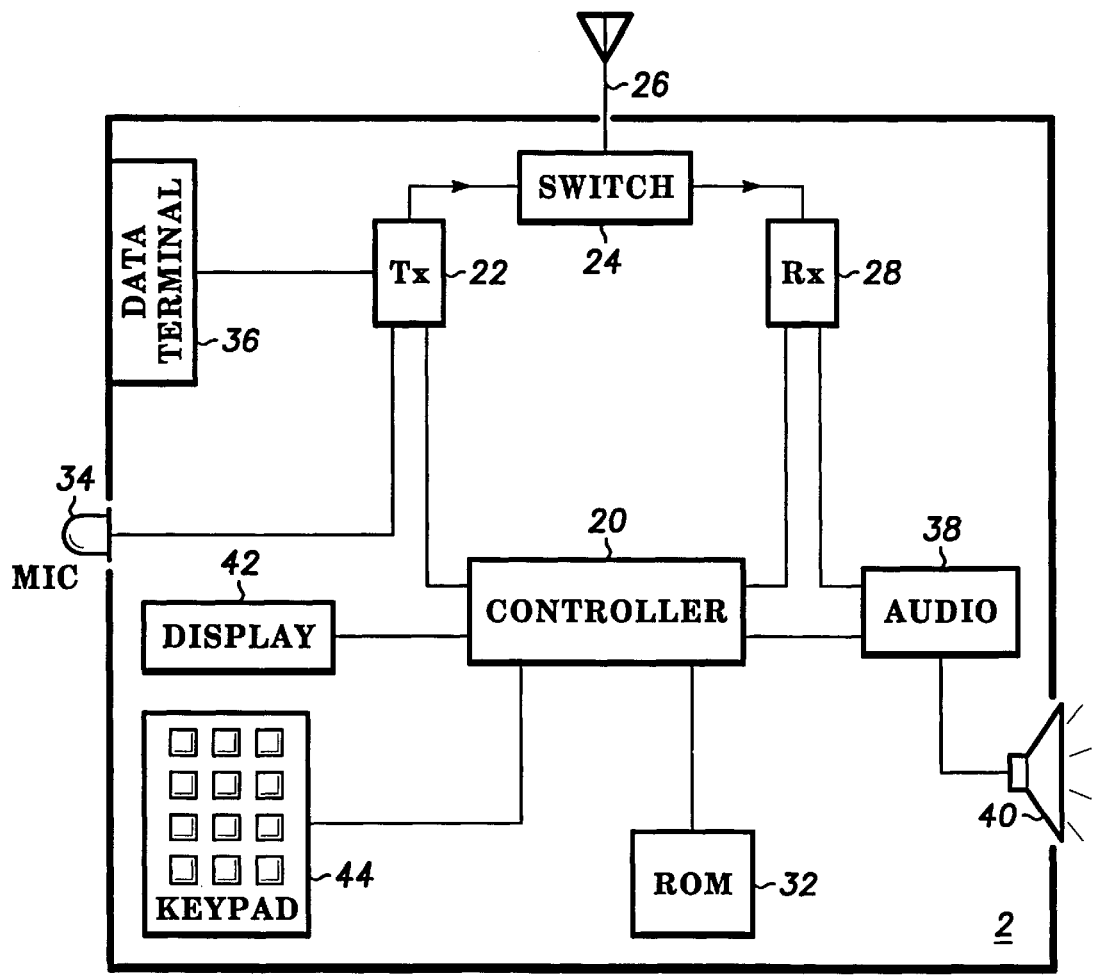
FIG. 2 illustrates a portable- or a mobile radio in accordance with the present invention.

FIG. 2 illustrates a digital radio 2 in accordance with the present invention. The radio of FIG. 2 may be either a portable- or a mobile radio. The digital radio 2 of the invention may be compliant with the DIIS radio standard.

The digital radio 2 of FIG. 2 can transmit speech from a user of the radio. The radio comprises a microphone 34 which provides a signal for transmission by the radio. The signal from the microphone is transmitted by transmission circuit 22. Transmission circuit 22 transmits via switch 24 and antenna 26.

Digital radio 2 also has a controller 20 and a read only memory (ROM) 32. Controller 20 may be a microprocessor. ROM 32 is a permanent memory, and may be a non-volatile Electrically Erasable Programmable Read Only Memory (EEPROM). ROM 32 may contain various different regions of memory.

The digital radio 2 of FIG. 2 also comprises a display 42 and keypad 44, which serve as part of the user interface circuitry of the radio. At least the keypad 44 portion of the user interface circuitry is activatable by the user. Voice activation of the radio, or other means of interaction with a user, may also be employed.

Signals received by the radio are routed by the switch to receiving circuitry 28. From there, the received signals are routed to controller 20 and audio processing circuitry 38. A loudspeaker 40 is connected to audio circuit 38. Loudspeaker 40 forms a further part of the user interface.

A data terminal 36 may be provided. Terminal 36 would provide a signal comprising data for transmission by transmitter circuit 22, switch 24 and antenna 26.

The digital radio 2 of the invention may be used in 'direct mode', to communicate directly with other portable or mobile radios, without the communication link passing through a base station. However, digital radio 2 may communicate via a base station 8 of a radio network with other radios, or through the telephone system (POTS). Digital radio 2 is designed to be able to operate over a single channel communication link, in pseudo-duplex communication.

For operating in pseudo-duplex radio communication, digital radio 2 has the following particular features:

(i) Transmitter 22 and switch 24 act as signal transmission means for time division duplex signal transmission over a single radio channel.

(ii) Switch 24 and receiver 28 act as signal reception means for time division duplex signal reception over the single radio channel.

(iii) Controller 20 is adapted to derive a value of a source signal activity parameter VAD for the digital radio 2. The source signal activity parameter VAD indicates the likelihood of there being a source signal for transmission by the digital radio 2 to a second digital radio 4 over the said single radio channel. The second digital radio 4 is a radio with which the first digital radio 2 is in communication. Essentially, digital radio 2 derives a measure of whether there is a signal, for example speech from the user, for the radio to transmit. If there is signal for transmission, then the radio will require a sufficiently large proportion of the time on the single radio channel to transmit the signal.

(iv) Controller 20 is further adapted to derive a first value (VADDir$_1$) of a signal direction parameter VADDir. The first value of the signal direction parameter VADDir is derived in dependence on both the value of the signal activity parameter VAD for the digital radio 2 and a second value (VADDir$_2$) of the signal direction parameter VADDir received from the second digital radio 4. Thus the first value (VADDir$_1$) of the signal direction parameter VADDir is a measure of both the likelihood of there being source signal for transmission by radio 2, and the value of the signal direction parameter VADDir sent to the first digital radio 2 by the second digital radio 2. An example of an exact calculation of the signal direction parameter VADDir by digital radio 2 is given below.

(v) Controller 20 is further adapted to receive the second value (VADDir$_2$) of the signal direction parameter VADDir over the said single radio channel from the second digital radio 4. This provides the second value (VADDir$_2$) of the signal direction parameter VADDir for digital radio 2 to use in calculating its own, first value (VADDir$_1$) of the signal direction parameter VADDir. Controller 20 is also adapted to transmit the first value (VADDir$_1$) of the signal direction parameter VADDir over the said single radio channel to the second digital radio 4. This ensures that the second radio 4 knows the first value (VADDir$_1$) of the signal direction parameter VADDir from the first digital radio 2. The second digital radio 4 then uses this first value (VADDir$_1$) of VADDir in its own calculation of VADDir.

(vi) Controller 20 is further adapted to select the proportions of time for transmission and reception over the single radio channel in dependence on the first value (VADDir$_1$) of the signal direction parameter VADDir. This means that the digital radio 2 is able to vary the proportion of time available to it to transmit over the single radio channel, in dependence on the value (VADDir$_1$) of parameter VADDir which it has calculated.

Figure 3:
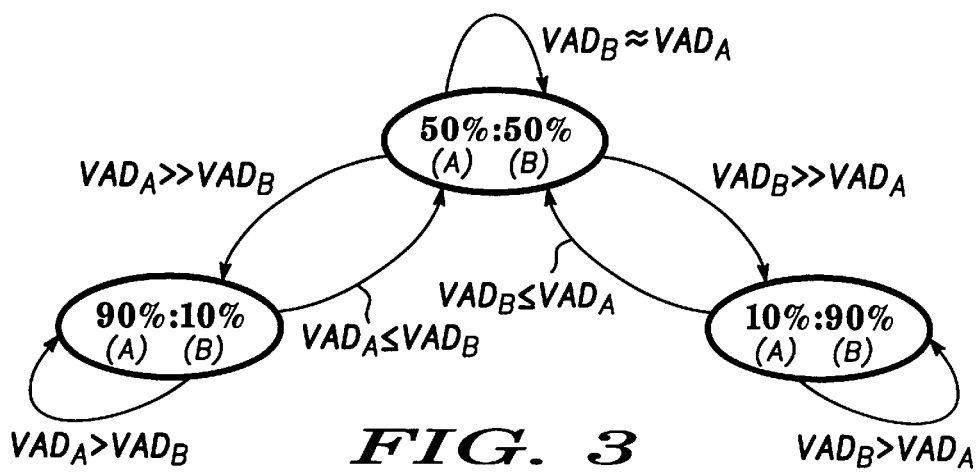
FIG. 3 illustrates an idealised state diagram for communication between two digital radios, communicating over a single radio channel.

FIG. 3 shows a state diagram illustrating modes of communication between two digital radios communicating over a single radio channel. The state diagram also illustrates permitted changes between the modes of communication. FIG. 3 is an idealised picture. Suffixes A and B in FIG. 3 equate to suffixes 1 and 2 used above for the values of VADDir for the first digital radio and the second digital radio respectively.

The three ovals in FIG. 3 are marked with the percentages of the time on the single radio channel for which the two radios are transmitting. For example, the oval towards the lower left of the FIG. indicates that the first radio is transmitting for 90% of the time. The second radio, with which the first radio is communicating, is transmitting on the single radio channel for the remaining 10% of the time. This proportion of the transmission time leaves the second radio only enough time to transmit 'silence' descriptors.

These indicate to the first radio that there is no signal activity by the user of the second radio, only background noise.

In the applicants' practical version of a time division duplex radio, the proportions of time for transmission and reception are actually closer to 20% and 80%, when one party has speech to transmit, and the other party has silence. However, the 10%:90% apportioning of time shown in FIG. 3 illustrates the principle of the arrangement clearly.

The arrows on FIG. 3 indicate possible routes by which the 'system' of the two radios can transition from one communication state to another. Thus the system can transition directly from the state described in the previous paragraph to the state shown in the oval towards the upper centre of the FIG. In this latter state, both the first and the second radios are transmitting for 50% of the time. However, the system has to pass through the 50%:50% state when transitioning from 90%:10% to 10%:90%.

In general terms, a system of two radios can be made to function with a proportion of transmit: receive time chosen from a fairly wide range, in fact of X%:(100-X)%, where 0<X<50%. In the situation where one radio has speech to transmit, and the radio with which it is communicating has none, a value of X closer to 0 than 50 in this inequality provides clearer speech transmission.

The inequalities written next to each arrow on FIG. 3 give the conditions under which each state transition can occur. For example, the transition from the 10%:90% state to the 50%:50% state occurs if the value of VAD for the first radio (Radio 'A' on FIG. 3) is less than or equal to the value of VAD for radio B.

The decision making process indicated in the arrangement of FIG. 3 requires instant, precise knowledge by each radio of the VAD values held by both radios. However, this is not practicable. There are two problems associated with the ideal scheme of FIG. 3:

(i) Firstly, the VAD information must in practice be conveyed over an error prone channel from party A to party B and vice-versa.

(ii) Secondly, each party should have early warning of the most likely transmission modes so that speech coding in the radio, which has an inherent processing delay, can be performed at the appropriate rate. This problem may be solved by ensuring that both parties have visibility of the VAD decisions as early as possible.

There are two mechanisms by which problem (i) above can be solved:

(a) The simplest solution to this problem is for the two radios to send their respective raw VAD values to each other, and to acknowledge receipt of the VAD value from the other party. There must also be visibility of the current 'state' of the link with this mechanism. This allows prediction of the actual future impact of VAD values in order to implement a state transition model such as FIG. 3 reliably. One of the members of the link is designated the master and they action the appropriate format for the link (90:10, 50:50 or 10:90) for the next frame.

A 'soft' voice activity detector may be used to decide whether there is signal activity at a radio for transmission to the other radio. A 'soft' voice activity detector is one which gives a range of values, each indicating the likelihood that there is voice signal for transmission by the radio.

Consider each radio to be using a soft decision VAD which provides a 2-bit binary output which can take the values 0, 1, 2 or 3. Here 0 represents silence with high confidence and 3 represents active speech with high confidence. A scheme could be used where the difference between the values of VAD held by each radio was used to decide on the proportion of the total transmission time over the single radio channel available to each radio. A simple VAD-difference scheme would have 7 possible states of −3 to +3. Then, for example, the state transitions could be driven from the 50%:50% state to the 90%:10% state when the VAD difference values +2, and to the 10%:90% state when the VAD difference values −2. Other state transitions would require other thresholding.

(b) The second possible solution is the subject of the appended claims. This solution is for each party to repeatedly transmit an overall soft "VAD-direction" (VADDir) value at given times from one to another, in such a way as to include the value heard from the other unit plus a correction due to its own soft VAD value.

In its simplest form this could be a simple VAD difference ($VAD_1$–$VAD_2$) moving backwards and forwards. However, it is possible, and indeed desirable, to arrange for a more complex integrating mechanism which embodies a state memory, in order to implement a more complex protocol as in FIG. 3. A state memory means that the current value of VADDir is dependent on both present and former conditions.

The integrating mechanism could, for example, work as follows, and could independently omit the need for state monitoring.

Consider the same 2-bit soft VAD (as described above) being processed by the two parties, the first radio and the second radio, using a pair of simple algorithms, respectively:

Party A (First radio):

If the received $VADDir_B>0$, then set $VADDir_A=VADDir_B+VAD_A-2$

Otherwise set $VADDir_A=VADDir_B+VAD_A-1$

But if this makes $VADDir_A>3$, then set $VADDir_A=3$

Party B (Second radio):

If the received $VADDir_A<0$, then set $VADDir_B=VADDir_A-VAD_B+2$

Otherwise set $VADDir_B=VADDir_A-VAD_B+1$

But if this makes $VADDir_B<-3$, then set $VADDir_B=-3$

The value of VADDir is sent by each radio to the other after each VAD exchange and the value of VADDir is thresholded to yield the state of the link at any one time.

An appropriate thresholding scheme would be:

If (VADDir +2) Use 90%:10%

If (−2<VADDir<+2) Use 50%:50%

If (VADDir −2) Use 10%:90%

It is easy to show that the above scheme implements the algorithm of FIG. 3 by examining the state transition table of Table 1 below. Table 1 shows state transitions for the first radio 2, in dependence on the values of $VADDir_1$ which it derives from its own VAD value, and the value $VADDir_1$ of VADDir received from the second radio 4.

TABLE 1

Next VADDir₁ State Values

|   |   | VAD₁ | | | |
|---|---|---|---|---|---|
|   |   | 0 | 1 | 2 | 3 |
| Received VADDir₂ Value | +3 | +1 | +2 | +3 | +3 |
|  | +2 | 0 | +1 | +2 | +3 |
|  | +1 | -1 | 0 | +1 | +2 |
|  | 0 | -1 | 0 | +1 | +2 |
|  | -1 | -2 | -1 | 0 | +1 |
|  | -2 | -3 | -2 | -1 | 0 |
|  | -3 | -3 | -3 | -2 | -1 |

90%:10% Mode (upper right shaded)
50%:50% Mode (central diagonal)
10%:90% Mode (lower left shaded)

This table shows each of the seven possible values of VADDir from −3 to +3 which the radio can receive. Each of these values occupies the first cell of one of the rows. The four possible values of $VAD_1$ from 0 to +3 are shown along the top of the table, each at the head of a column. The entries in the table show the new value of $VADDir_1$, which would result from the received $VADDir_2$ shown at the left of the row, and the $VAD_1$ value shown at the top of the column.

The shaded area at the upper right of the table indicates the new values of $VADDir_1$ which would cause the radio to operate in the 90%:10% mode.

The shaded area at the lower left of the table indicates the new values of $VADDir_1$ which would cause the radio to operate in the 10%:90% mode.

The white central zone of the table leading from the upper left to the lower right contains $VADDir_1$ values between +1 and −1. These are the new values of $VADDir_1$ which would cause the radio to operate in the 50%:50% mode.

Thus table one illustrates one practical example of an algorithm in accordance with the invention. The algorithm allows values of VADDir sent from one radio to the other to control the proportion of the time for which each radio transmits and receives on the single radio channel.

When the first radio 2 has calculated a value for $VADDir_{12}$, the first radio then transmits this value to the second radio 4. The second radio 4 then uses its algorithm, that explained as 'Party B' above, to update its value of VADDir using the value of $VADDir_1$ received. The second radio 4 then has an updated value $VADDir_2$ of VADDir which it transmits back to first radio 2. This cycle repeats.

Transmission technique

The applicant has also addressed the problem of how to send the values of VADDir reliably between the radios.

In order to send the value of VADDir in a robust manner, the applicant has considered using a 7-bit cyclic code for the radio of the invention to encode VADDir values for transmission. Each bit shift of the parent polynomial codeword is responsible for conveying a value of VADDir from −3 to +3, as follows:

| VADDir | Bit pattern Representing VADDir |
|---|---|
| +3 | 0001011 |
| +2 | 0010110 |
| +1 | 0101100 |
| 0 | 1011000 |
| -1 | 0110001 |

-continued

| VADDir | Bit pattern Representing VADDir |
|---|---|
| -2 | 1100010 |
| -3 | 1000101 |

This code is a "perfect code" with every codeword having Hamming distance of 4 between it and any other codeword. It can therefore detect any pattern of errors except when exactly 4 errors occur.

In the event of an error in receiving the codewords, the most appropriate action for a radio unit is to predict the response of the other side by assuming a neutral overall response but favouring the other party slightly. This effect of this is shown in Table 2.

TABLE 2

Assumed State Values After Error

|   |   | Assumed Value |
|---|---|---|
| Previous VADDir Value Sent | +3 | +2 |
|  | +2 | +1 |
|  | +1 | 0 |
|  | 0 | 0 |
|  | -1 | -1 |
|  | -2 | -2 |
|  | -3 | -3 |

90%:10% Mode
50%:50% Mode
10%:90% Mode

The digital radio 2 illustrated in FIG. 2 performs an inventive method of transmission time mediation for pseudo-duplex radio communication. The method comprises:

(i) Transmitting a first time division duplex signal over a single radio channel.

(ii) Receiving a second time division duplex signal over the said single radio channel.

(iii) Deriving a value $VADDir_1$ of a source signal activity parameter VAD, the source signal activity parameter VAD indicating the likelihood of there being a source signal for transmission as the first time division duplex signal over the said single radio channel. If the operator of the radio begins speaking for example, the value of VAD in the embodiment of the invention described above will rise.

(iv) Receiving a value $VADDir_2$ of a signal direction parameter VADDir with the second time division duplex signal over the said single radio channel. This value is that derived by the digital radio 4 with which digital radio 2 is in communication over the single communication channel.

(v) Deriving a revised value $VADDir_1$ of the signal direction parameter $VADDir_1$ the revised value $VADDir_1$ of the signal direction parameter VADDir being derived in dependence on both the value of the signal activity parameter VAD and the value $VADDir_2$ of the signal direction parameter VADDir received with the second time division duplex signal over the said single radio channel. Digital radio 2 therefore 'updates' the value of $VADDir_1$ which it holds, this updating being based on the value of $VADDir_2$ which it receives over the communication channel from digital radio 4.

(vi) Transmitting the revised value $VADDir_1$ of the signal direction parameter VADDir over the said single radio channel and selecting the proportions of time for transmitting the first time division duplex signal and receiving the second time division duplex signal in dependence on the revised value VADDir$_1$ of the signal direction parameter VADDir. Thus digital radio 2 uses the updated value of VADDir$_1$ to decide for what proportion of time it can transmit. Digital radio 2 also transmits the updated value of VADDir$_1$ to digital radio 4, for use by digital radio 4 in the next cycle of updating its value of VADDir$_2$.

This cycle of updating and then transmitting 'latest' values of VADDir repeats.

Figure 4:
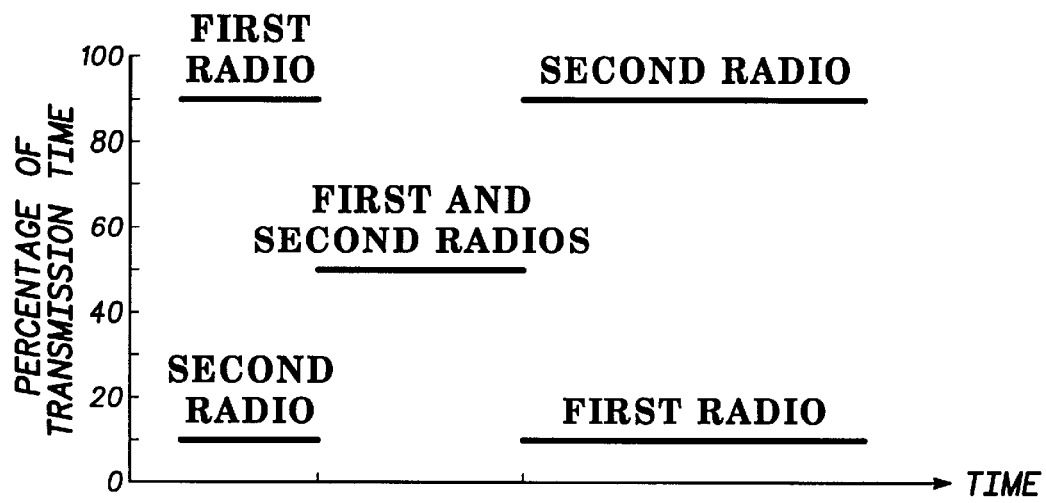
FIGS. 4 and 5 illustrate practical examples of the development over time of an ongoing communication between two digital radios, communicating over a single radio channel, in accordance with the present invention.
Figure 5:
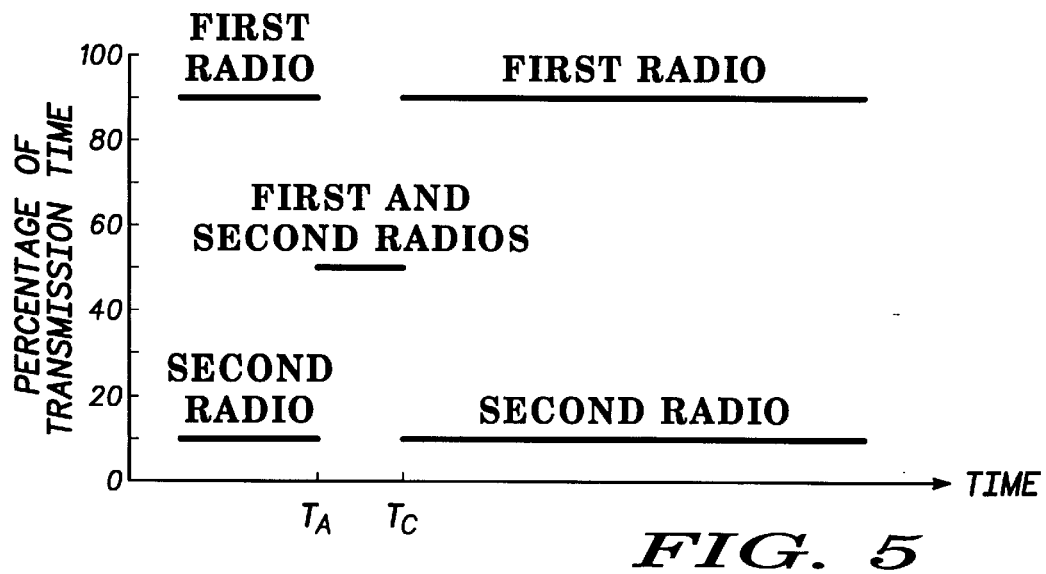

FIGS. 4 and 5 illustrate practical examples of the development over time of an ongoing communication between two digital radios, which are communicating over a single radio channel, in accordance with the present invention.

FIGS. 4 and 5 show on their y-axes the percentage of the time given to each of two digital radios for transmission over the single radio channel, at the time shown on the x-axis.

FIG. 4 shows at its left edge a conversation in which the user of the first radio is speaking, and has 90% of the transmission time. See the upper trace. The user of the second radio is listening at this point, and transmits only background noise in the 10% of time allocated to it. See the lower trace. With the user of the first radio speaking, the value of VAD will be high for the first radio, for example+3. A VADDir$_1$ value calculated in accordance with the example of Table 1 above will therefore be high, and the first radio will hold on to 90% of the transmit time.

At time point T$_A$ the user of the second radio begins to speak, whilst the user of the first radio is still speaking. The value of VAD for the second radio will rise. This will result in the value of VADDir calculated by the second radio, VADDir$_2$, being lower. This is due to the relationship given for 'Party B' above:

VADDir=VADDir−VAD$_B$+1

As a result, the value VADDir$_2$ of VADDir sent to the first radio from the second radio will fall. The value VADDir$_1$ of VADDir calculated by the first radio will now fall within the central diagonal band in Table 2. This will cause the two radios to move to a state of each having 50% of the transmission time on the single radio channel.

This can be seen on FIG. 4, between the time points T$_A$ and T$_B$

In the example shown in FIG. 4, the user of the radio notices that the user of the second radio has started to speak. The user of the first radio then stops speaking at time point T$_B$ and starts to listen. The value of VAD for the first radio will therefore fall, whilst that for the second radio will remain high.

The two radios will therefore transition to a state where the first radio only has 10% of the transition time, and the second radio has 90% of the transition time.

This can be seen on FIG. 4, to the right of time point T$_B$.

FIG. 5 shows at its left side a conversation between two radios which starts as did that in FIG. 4. As in FIG. 4, at time point T$_A$ in FIG. 5 the user of the second radio begins to speak, whilst the user of the first radio is still speaking. This will cause the two radios to move to each having 50% of the transmission time on the single radio channel.

However, in the conversation depicted in FIG. 5, the user of the first radio continues to speak and the user of the second radio stops speaking at time point T$_C$. Such a scenario may occur when the user of the second radio attempts to interrupt the user of the first radio, but the user of the first radio does not give way.

At time point T$_C$ therefore, VAD is high for the first radio, but VAD for the second radio returns once more to being low. Thus the value of VADDir$_1$ rises at time point T$_C$ and the first radio re-gains 90% of the transmission time. The second radio then has only 10% of the transmission time.

This can be seen on FIG. 5, to the right of time point T$_C$.

The digital radios of the invention may communicate over a direct mode radio channel. However, the single radio channel may link the first digital radio to the second digital radio via a base station.

What is claimed is:

1. A digital radio for pseudo-duplex radio communication, comprising:

signal transmission means for time division duplex signal transmission over a single radio channel;

signal reception means for time division duplex signal reception over the said single radio channel;

a controller adapted to derive a value of a source signal activity parameter (VAD) for the digital radio, the source signal activity parameter (VAD) indicating the likelihood of there being a source signal for transmission by the digital radio to a second digital radio over the said single radio channel;

the controller being further adapted to derive a first value (VADDir$_1$) of a signal direction parameter (VADDir), the first value of the signal direction parameter (VADDir) being derived in dependence on both the value of the signal activity parameter (VAD) for the digital radio and a second value (VADDir$_2$) of the signal direction parameter (VADDir) received from the second digital radio;

the controller being further adapted to receive the second value (VADDir$_2$) of the signal direction parameter (VADDir) over the said single radio channel from the second digital radio, and to transmit the first value (VADDir$_1$) of the signal direction parameter (VADDir) over the said single radio channel to the second digital radio;

the controller being further adapted to select the proportions of time for transmission and reception in dependence on the first value (VADDir$_1$) of the signal direction parameter (VADDir).

2. A digital radio in accordance with claim 1, wherein the controller is further adapted to derive the value of the source signal activity parameter (VAD) for the digital radio using a soft voice-activity detector.

3. A digital radio in accordance with claim 2, wherein the soft voice-activity detector provides a 2 bit output taking values from 0–3, where 0 represents silence with high confidence and 3 represents active speech with high confidence.

4. A digital radio in accordance with claim 3, wherein the controller is further adapted to derive the first value of the signal direction parameter VADDir$_1$, according to the following rules:

(i) If the second value of the signal direction parameter VADDir$_2$ received from the second digital radio is >0, then set the first value of the signal direction parameter VADDir$_1$, to VADDir$_1$=VADDir$_2$+VAD$_1$−2

(ii) If the second value of the signal direction parameter VADDir$_2$ received from the second digital radio is not >0, then set the first value of the signal direction parameter VADDir$_1$ to VADDir$_1$ =VADDir$_2$+VAD$_1$−1

(iii) If VADDir$_1$ would then be >3, set VADDir$_1$=3.

5. A digital radio in accordance with claim 1, wherein the controller is further adapted to select the proportions of time for transmission and reception from one of at least the three pre-determined proportions of:

(i) transmission time <50% and reception time >50%;
(ii) transmission time substantially 50% and reception time substantially 50%;
(iii) transmission time >50% and reception time <50%.

6. A digital radio in accordance with claim 5, wherein the controller is further adapted to select the proportions of time for transmission and reception from one of the three pre-determined proportions of, where X is a number less than 50:

(i) X% transmission time and 100-X% reception time;
(ii) substantially 50% transmission time and substantially 50% reception time;
(iii) 100-X% transmission time and X% reception time.

7. A digital radio in accordance with claim 5, wherein the controller is further adapted to select the proportions of time for transmission and reception from one of the three pre-determined proportions:

(i) substantially 20% transmission time and substantially 80% reception time;
(ii) substantially 50% transmission time and substantially 50% reception time;
(iii) substantially 80% transmission time and substantially 20% reception time.

8. A digital radio in accordance with claim 1, wherein the radio is a digital portable or mobile radio, and the single radio channel links the digital radio to the second digital radio via a base station.

9. A digital radio in accordance with claim 1, wherein the digital radio is a digital portable or mobile radio, and the single radio channel is a direct mode radio channel linking the digital radio and the second digital radio.

10. A digital radio in accordance with claim 1, wherein the digital radio is a digital portable or mobile radio operating in accordance with the DIIS radio standard.

11. A digital portable- or mobile radio system, comprising at least two radios in accordance with claim 1.

12. A method of transmission time mediation for pseudo-duplex radio communication, the method comprising:

transmitting a first time division duplex signal over a single radio channel;

receiving a second time division duplex signal over the said single radio channel;

deriving a value of a source signal activity parameter (VAD), the source signal activity parameter (VAD) indicating the likelihood of there being a source signal for transmission as the first time division duplex signal over the said single radio channel;

receiving a value (VADDir$_2$) of a signal direction parameter (VADDir) with the second time division duplex signal over the said single radio channel;

deriving a revised value (VADDir$_1$) of the signal direction parameter (VADDir), the revised value (VADDir$_1$) of the signal direction parameter (VADDir) being derived in dependence on both the value of the signal activity parameter (VAD) and the value (VADDir$_2$) of the signal direction parameter (VADDir) received with the second time division duplex signal over the said single radio channel; and transmitting the revised value (VADDir$_1$) of the signal direction parameter (VADDir) over the said single radio channel and selecting the proportions of time for transmitting the first time division duplex signal and receiving the second time division duplex signal in dependence on the revised value (VADDir$_1$) of the signal direction parameter (VADDir).

* * * * *